United States Patent
Renau

(10) Patent No.: US 6,636,772 B1
(45) Date of Patent: Oct. 21, 2003

(54) SYSTEM AND METHOD FOR ENABLING DEVICE OPERATION ATTRIBUTE-CONTROLLING COMMANDS TO BE ENTERED AND INDICATED BY THE OPERATION OF ELEMENTS FROM OUTSIDE THE DEVICE

(75) Inventor: Karol Renau, Calabasas, CA (US)

(73) Assignee: Renau Corporation, CA (US)

( * ) Notice: Subject to any disclaimer, the term of this patent is extended or adjusted under 35 U.S.C. 154(b) by 0 days.

(21) Appl. No.: 09/927,915

(22) Filed: Aug. 10, 2001

Related U.S. Application Data

(63) Continuation of application No. 09/188,498, filed on Nov. 9, 1998, now abandoned, which is a continuation-in-part of application No. 08/857,551, filed on May 16, 1997, now Pat. No. 5,835,993.

(51) Int. Cl.$^7$ .............................................. G05B 15/00
(52) U.S. Cl. ...................................................... 700/83
(58) Field of Search .......................... 700/17, 240, 14, 700/83, 84; 340/5.1; 708/131

(56) References Cited

U.S. PATENT DOCUMENTS

| | | | | |
|---|---|---|---|---|
| 4,325,081 A | * | 4/1982 | Abe et al. ................... 368/224 |
| 4,385,204 A | * | 5/1983 | Wine ........................ 307/141.4 |
| 4,695,942 A | * | 9/1987 | Levine et al. ................ 348/738 |
| 5,027,284 A | * | 6/1991 | Senghaas et al. ............. 700/83 |
| 5,129,548 A | * | 7/1992 | Wisniewski ............... 222/129.4 |
| 5,596,348 A | * | 1/1997 | Hayakawa .................... 141/83 |
| 5,601,218 A | * | 2/1997 | Takenaka ..................... 345/156 |
| 5,808,296 A | * | 9/1998 | McMonagle et al. ..... 222/129.1 |
| 5,850,212 A | * | 12/1998 | Nishibori .................... 250/221 |
| 5,950,870 A | * | 9/1999 | Takenaka ............... 340/825.19 |
| 5,966,093 A | * | 10/1999 | Chapman ............... 342/357.17 |
| 6,046,684 A | * | 4/2000 | Hamersley et al. .... 340/825.69 |
| 6,108,097 A | * | 8/2000 | Suzuki et al. ................ 358/1.1 |

* cited by examiner

Primary Examiner—Ramesh Patel
Assistant Examiner—Edward F Gain
(74) Attorney, Agent, or Firm—Fulwider Patton Lee & Utecht, LLP

(57) ABSTRACT

A system and method for enabling the entry and indicating of a command relating to a function of a device, by an operator from outside the device, without the operator accessing the inside of the device. The system includes an entry element and an indicating element, and a processor for processing and implementing the entered and indicated command in the device.

21 Claims, 1 Drawing Sheet

SYSTEM AND METHOD FOR ENABLING DEVICE OPERATION ATTRIBUTE-CONTROLLING COMMANDS TO BE ENTERED AND INDICATED BY THE OPERATION OF ELEMENTS FROM OUTSIDE THE DEVICE

RELATED APPLICATIONS

This application is a continuation of application Ser. No. 09/188,498, filed Nov. 9, 1998, which is a continuation-in-part of application Ser. No. 08/857,551, filed on May 16, 1997, issued as U.S. Pat. No. 5,835,993 on Nov. 10, 1998.

BACKGROUND OF THE INVENTION

1. Field of the Invention

This invention relates generally to improvements in enabling the modifying of the operational parameters of a device. In particular, it relates to a new and improved system and method for enabling the entry and indicating from outside the device of a device function controlling command.

2. Description of the Related Art

The systems and methods of the present invention are particularly useful in providing a system for enabling elements operated from outside a device to control attributes of the functions of the device, without access to the inside of the device.

A variety of systems and methods have been developed over the years for modifying the operating parameters of a device. Such systems usually require access to a control element on the inside of a device. In a device such as a beverage dispensing machine wherein functions are controlled by a processor, for example, such control element may comprise a timer and a dial located inside the device, for enabling the adjusting of attributes of the functions of the device. Such timer and dial may be utilized to adjust the volume of a beverage dispensed in a cup in the beverage dispensing machine, by adjusting the length of time a beverage is dispensed into a cup. In some implementations of a control system, an alphanumeric display on the outside of a processor-controlled devices enables control from the outside of the device of a processor located inside the device.

However, there have been problems associated with modifying the operating parameters in such control systems. Control elements located inside the device require inefficient access to the interior thereof, and are more time consuming and subject to causing damage in requiring access thereinto than a system which can be if operated from outside the device without access thereinto. Also, an alphanumeric display and the associated keypads for operation thereof are relatively expensive to obtain, require a driver therefor, and require substantial power for the operation thereof.

Therefore, the present invention provides improved systems and methods for enabling efficient device function-related command entry and indicating from outside the device, without access to the inside of the device. It also enables effective processing and implementation of entered and indicated parameter-modifying device commands. The inventions disclosed herein satisfy these and other needs.

SUMMARY OF THE INVENTION

The present invention, in general, provides a new and improved system and method for enabling the effective entry and indicating of commands relating to the operation of a device, from outside the device, without access to the inside of the device. The present invention also enables efficient processing of the entered and indicated commands, for implementation thereof.

More particularly, for example, in an embodiment of the present invention, a system is provided for enabling an operator from outside the device to enter a command relating to a function of the device, and for indicating to the operator outside the device the nature of the command entered, without operator access to the inside of the device. The system includes an entry element, mounted on the device, for enabling an operator from outside the device to enter a command relating to a function of the device. The system also includes an indicating element, mounted on the device, for indicating to the operator outside the device the nature of the command entered, and for interacting with the entry element to respond to the actuation thereof.

A processing element, mounted in the device, processes the command entered in the device responsive to the actuation of the entry element, to generate the actuation of the indicating element responsive thereto, for indicating the nature of the command entered. The processing element also interacts with the device, to enable the device to perform the function responsive to the entry and indicating of the entry and indicating of the command.

The above objects and advantages of the present invention, as well as others, are described in greater detail in the following description, when taken in conjunction with the accompanying drawings of illustrative embodiments.

DETAILED DESCRIPTION OF THE PREFERRED EMBODIMENTS

The present invention is directed to an improved system and method for enabling the entry and indicating of a command relating to a function of a device from outside the device, without access to the inside of the device, in an efficient and effective manner. The invention enables the command to be entered effectively from outside the device by an operator through an entry element, and to indicate to the operator outside the device through an indicating element the nature of the command entered. Additionally, the present invention enables convenient and efficient processing and implementing of entered and indicated commands. The preferred embodiments of the improved system and method are illustrated and described herein by way of example only and not by way of limitation.

Figure 1:
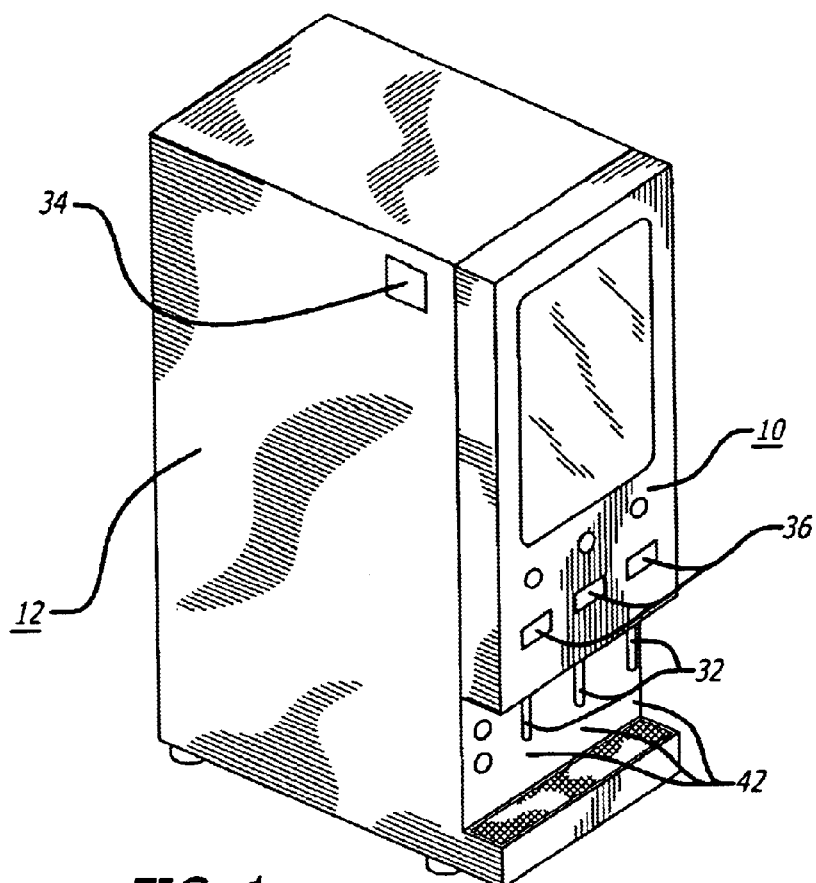
FIG. 1 is a perspective view of a system pursuant to an embodiment of the invention, in a device wherein the attribute-modifying functions are to be controlled by the system.
Figure 2:
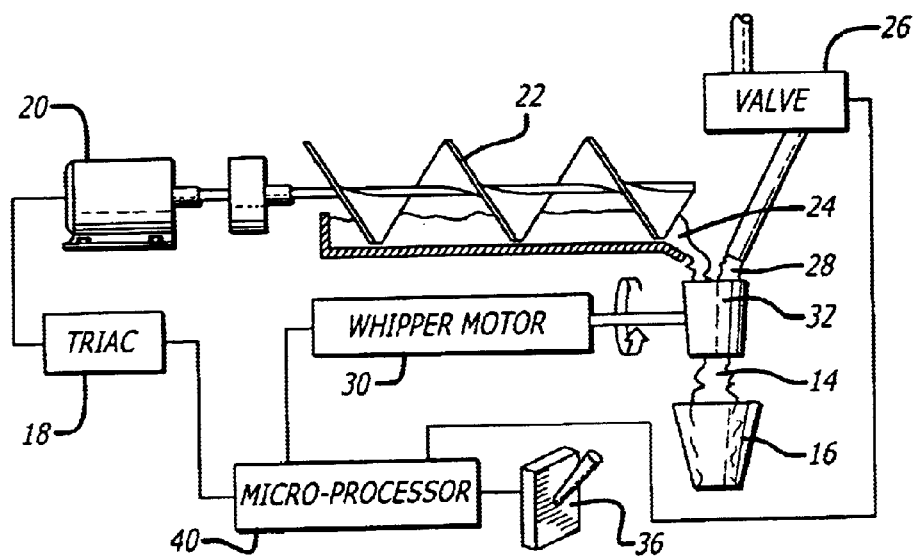
FIG. 2 is a diagram, partly in block form, of the elements of the device and a portion of the system in accordance with an embodiment of the invention.

In the drawings, wherein like reference numerals denote like or corresponding parts throughout the drawing figures, and particularly in the preferred embodiments in accordance with the invention as shown in FIGS. 1–2, for example, a system 10 is provided for enabling the entry and indicating from outside a device 12 of a command relating to a function thereof.

The device 12, for example, may constitute a device for brewing a beverage 14 such as heated coffee, and for dispensing the beverage 14 in a container 16 such as a cup.

The device 12 may include a triac 18, for controlling the operational elements of the device 12. The operational elements of the device 12 which are controlled by the triac 18 may include an alternating current motor 20, regulated by the triac 18, and an auger 22, rotatable through operation of the motor 20. The auger 22 delivers a powder 24, constituting a powder form of the beverage 14, to be mixed as a component of the beverage 14 for dispensing thereof. The operational elements of the device 12 may further include a control valve 26, for controlling the amount of a fluid 28 such as water to be mixed with the powder 24, and a whipper motor 30, for whipping the powder 24 and the fluid 28 in an outlet tube 32 for forming the beverage 14 to be dispensed thereby. The device 12 further includes an on-off push button 34, which also enables setting of the mode of operation of the device upon actuation thereof in a preset manner.

The system 10 of the present invention enables an operator, such as a serviceman, from outside the device 12, to enter a command relating to a function of the device 12, and indicates to the operator outside the device the nature of the command entered responsive thereto, without the operator accessing the inside of the device 12.

Referring to FIGS. 1–2, in a preferred embodiment pursuant to the present invention, for example, the system 10 includes at least one entry element 36, mounted in the device 12 and accessible to the operator from outside the device 12, for enabling the operator from outside the device 12 to enter a command relating to a function of the device 12, in the command entry mode of operation of the device 12. It enables actuation thereof in a preset actuation sequence by the operator from outside the device 12. The preset actuation sequence of the entry element 36, for example, may relate to a sequence for modifying operational parameters of the device 12. In the brewing and dispensing mode of operation of the device 12, the entry element 36 enables the actuation of the brewing and dispensing of the heated beverage. The entry element 36, for example, comprises a push button.

At least one indicating element 38 is further included in the system 10, which is mounted in the device 12 and observable from outside the device 12, for indicating to the operator outside the device the nature of the command entered. The indicating element 38 interacts with the entry element 36 to respond to actuation of the entry element 36, and may be located proximate thereto. The indicating element 38, for example, comprises a light emitting diode. It enables actuation thereof in a preset actuation sequence to be indicated to the operator outside the device 12. The preset actuation sequence of the indicating element 38 may, for example, comprise a sequence for indicating the modifying of the operational parameters of the device 12. The indicating by the indicating element 38 of the preset activation sequence may comprise, for example, a preset series of pulses of light, which may comprise flashes or blinks, wherein each such series of light pulses corresponds to the nature of the entered command. In the brewing and dispensing mode of operation of the device 12, the indicating element 38 indicates the activation of the brewing and dispensing of the heated beverage. The indicating element 38, for example, comprises a light emitting diode.

The system 10 also includes a processing element 40, mounted in the device 12, for processing the command entered in the device 12 responsive to actuation of the entry element 36, for generating actuation of the indicating element 38 responsive thereto. The processing element 40 is connected to the entry element 36 and the indicating element 38. It includes programmed instructions for enabling entry of the command therein, so as to further interact with the device 12 to perform the function therein responsive to actuation of entry of the command through the entry element 36, and indicating of the entered command in the indicating element 38. The processing element 40, for example, comprises a microprocessor. The command entered in the processing element 40 through the entry element 36, and indicated by the indicating element 38, may relate for example to modifying operational parameters of the device 12.

In the exemplary device 12 in which the system 10 is incorporated, as shown in FIG. 1, there are three stations 42 for dispensing beverages, each of which includes an outlet tube 32, an entry element 36, and an indicating element 38. As seen in FIG. 2, the processing element 40 in the device 12 is also connected to the triac 18, the whipper motor 30, and the control valve 26, for controlling the functions of the device 12 relating thereto, responsive to actuation of the entry element 36.

Referring to FIGS. 1–2, in a method for the use of the preferred embodiments in accordance with the present invention, for example, the system 10 enables the operator, from outside the device 12, to enter a command relating to a function of the device 12, and indicates to the operator outside the device 12 the nature of the command entered, without the operator accessing the inside of the device 12. A command is entered by the operator from outside the device 12 relating to a function of the device 12, through the entry element 36. The command is processed in the processing element 40 in the device 12 responsive to entry of the command through the entry element 36. The nature of the command entered is indicated to the operator outside the device 12 through the indicating element 38, responsive to processing thereof in the processing element 40.

The entry element 36 is actuated in a preset actuation sequence, including at least one actuation thereof by the operator from outside the device 12. The preset actuation sequence of the entry element 36 may comprise a sequence for modifying operational parameters of the device 12. The indicating element 38 is actuated in a preset actuation sequence, including at least one actuation thereof responsive to actuation of the entry element 36, to indicate to the operator outside the device the nature of the command entered. The preset actuation sequence of the indicating element 38 may comprise a sequence for indicating the modifying of operational parameters of the device 12. The preset actuation sequence of the indicating element 38 may comprise a preset series of pulses of light, wherein each such preset series of light pulses corresponds to the nature of an entered command.

To prepare the system 10 for enabling an operator to perform a function relating to the device 12 from outside the device, if the device 12 is turned on and is in the brewing and dispensing mode of operation thereof, the operator enters a command entry mode by pressing in the on/off button 34 to turn the device 12 off. The entry element 36 is then pressed and held, and the on/off button 34 is released. The entry element 36 is continued to be held pressed in until the indicating element 36 starts generating pulses of light, whereupon the entry element 36 is released.

In an example of the operation of the system 10 for modifying an operational parameter of the device 12, in particular to confirm and/or reset the brew temperature in the device 12, which is factory preset to 200° F., the operator, after entry into the command entry mode, presses in the entry element 36 for two seconds and then releases it. The indicating element 38 will start to blink, to indicate the current temperature setting, with each blink indicating a 2° F. increment, starting at 170° F., with a maximum temperature of 204° F., at eighteen blinks.

To change the temperature, the entry element 36 is pressed in and held, whereupon the indicating element 38 will start quick flashing, with each flash equal to 2° F. After reaching 204° F., the cycle starts over at 170° F. The operator releases the entry element 36 when the desired temperature is reached. The newly set temperature will then be displayed by the indicating element 38. To set the new setting and exit the system 10, the operator presses in the on/off button 34.

In a further example of the operation of the system 10, to set the volume of the beverage 16 to be dispensed, after entering the command entry mode and placing a container 16 under an outlet tube 32, the entry element 36 at the location of the container 16 is pressed in by the operator and held until the beverage begins to be dispensed, and then released. When the desired volume of the beverage 14 is dispensed into the container 16, the entry element 36 is pressed in again to stop the flow. The operator may then set the setting by pressing in the on/off button.

In another example of the operation of the system 10, to change the ratio of powder 24 to fluid 28, after entering the command entry mode, the operator presses in and holds any two entry elements 36 until at least one indicating element 38 starts blinking, whereupon the entry elements 36 are released. The selected entry element 36 is then pressed and held for approximately one second, until the indicating element starts blinking, whereupon the entry element 36 is released. The number of blinks of the indicating element 38 equal the powder-to-fluid ratio, for example one blink equals ten percent, ten blinks equal one-hundred percent. To change the ratio, the entry element 36 is pressed in and held. Each quick flash of the indicating element 38 for example increases the ratio by ten percent, starting over at one-hundred percent. When the desired ratio is reached, the entry element 36 is released. To set the ratio and exit the ratio change mode, any other entry element 36 is pressed in.

In accordance with the present invention, the particular embodiments set forth above for the system 10 are capable of enabling command entry and indication from outside a device without access to the inside of the device. However, other forms of the system 10 may be utilized with the present invention without departing from the spirit and scope of the invention. For example, the system 10 may be incorporated in other types of devices. Additionally, while the system 10 is shown and described in reference to controlling the entry and indicating of particular command functions, it can control different command functions depending upon the nature thereof for particular devices. Based on the present disclosure, other constructions and applications are known to one skilled in the art.

In view of the above, it is apparent that the system and method of the preferred embodiments of the present invention enhances substantially the effectiveness of systems for controlling the modification of functional parameters of devices, by enabling the effective entry and indicating of function commands from outside a device, without accessing the inside of the device. The system and method further enable the efficient processing of entered and indicated function commands. The system and method also enable efficient implementing of modified functional parameters in the device.

While the present invention has been described in connection with the specific embodiments identified herein, it will be apparent to those skilled in the art that many alternatives, modifications and variations are possible in light of the above description. Accordingly, the invention is intended to embrace all such alternatives, modifications and variations as may fall within the spirit and scope of the invention disclosed herein.

What is claimed is:

1. A system for enabling an operator from outside a device to enter a command relating to a function of the device, and for indicating to the operator outside the device the nature of the command entered, without operator access to the inside of the device, comprising:

a single entry element, mounted on the device, for enabling an operator from outside the device to enter a command, by a preset series of actuations of the single entry element, relating to a function of the device;

a single indicating element, mounted on the device, for indicating to the operator outside the device, by a preset series of pulses of light emitted by the single indicating element, the nature of the command entered by the single entry element, adapted to interact with the single entry element to respond to the actuation thereof; and a processing element mounted in the device for processing the command entered in the device responsive to the actuation of the single entry element, for generating the actuation of the single indicating element responsive thereto for indicating the nature of the command entered by the single entry element, and for interacting with the device to enable the device to perform the function responsive to the entry of the command by the single entry element and the indicating of the command by the single indicating element.

2. The system of claim 1, wherein the single entry element is adapted to be actuated in a preset actuation sequence, including a plurality of actuations thereof by the operator from outside the device.

3. The system of claim 2, wherein the preset actuation sequence of the single entry element comprises a sequence for modifying operational parameters of the device.

4. The system of claim 1, wherein the single indicating element is adapted to be actuated in a preset actuation sequence, including a plurality of actuations thereof responsive to actuation of the single entry element, to indicate to the operator outside the device the nature of the command entered by the single entry element.

5. The system of claim 4, wherein the preset actuation sequence of the single indicating element comprises a sequence for indicating the modifying of operational parameters of the device.

6. The system of claim 5, wherein the single indicating by the indicating element of the preset actuation sequence of the single indicating element comprises a preset series of pulses of light, and each such series of light pulses corresponds to the nature of an entered command.

7. The system of claim 1, wherein the processing element comprises a microprocessor.

8. The system of claim 1, wherein the single entry element comprises a push button, connected to the processing element.

9. The system of claim 1, wherein the single indicating element comprises a light emitting diode, connected to the processing element.

10. The system of claim 1, wherein the device includes a controlling element for controlling the function relating to the device responsive to actuation of the single entry element and the processing element responsive thereto.

11. The system of claim 1, wherein the command adapted to be entered in the processing element through the single entry element relates to accessing and modifying operational parameters of the device.

12. The system of claim 1, wherein the command indicated by the single indicating element relates to the modifying of operational parameters of the device.

13. The system of claim 1, wherein the single indicating element is located proximate the entry element.

14. The system of claim 1, wherein the processing element includes instructions programmed therein for enabling entry of the command therein upon actuation thereof.

15. The system of claim 14, wherein the programmed instructions further enable actuation of the single indicating element for indicating the modifying of operational parameters of the device responsive to the entry of the command therein.

16. A method of enabling an operator from outside a device to enter a command relating to a function of the device, and for indicating to the operator outside the device the nature of the command entered, without operator access to the inside of the device in a system which comprises a single entry element, mounted on the device, for enabling an operator from outside the device to enter a command, by a preset series of actuations of the single entry element, relating to a function of the device, a single indicating element, mounted on the device, for indicating to the operator outside the device, by a preset series of pulses of light emitted by the single indicating element, the nature of the command entered by the single entry element, adapted to interact with the single entry element to respond to the actuation thereof, and a processing element mounted in the device for processing the command entered in the device responsive to the actuation of the single entry element and for generating the actuation of the single indicating element responsive thereto for indicating the nature of the command entered by the single entry element, and for interacting with the device to enable the device to perform the function responsive to the entry of the command by the single entry element and the indicating of the command by the single indicating element, wherein the method comprises:

entering a command from outside the device, by a preset series of actuations of the single entry element, relating to a function of the device;

processing the command in the processing element in the device responsive to entry of the command through the single entry element; and indicating to the operator outside the device, by a preset series of pulses of light emitted by the single indicating element, the nature of the command entered by the single entry element, responsive to processing thereof in the processing element.

17. The method of claim 16, wherein the single entry element is adapted to be actuated in a present actuation sequence, including a plurality of actuations thereof by the operator from outside the device, and wherein entering a command further comprises actuating the single entry element in a preset actuation sequence.

18. The method of claim 17, wherein the preset actuation sequence of the single entry element comprises a sequence for modifying operational parameters of the device, and wherein entering the command further comprises actuating the single entry element in a preset actuation sequence for modifying operational parameters of the device.

19. The method of claim 16, wherein the single indicating element is adapted to be actuated in a preset actuation sequence, including a plurality of actuations thereof responsive to actuation of the single entry element, to indicate to the operator outside the device the nature of the command entered by the single entry element, and wherein indicating the nature of the command entered further comprises actuating the single indicating element in a preset actuation sequence.

20. The method of claim 19, wherein the preset actuation sequence of the single indicating element comprises a sequence for the modifying of operational parameters of the device, and wherein indicating the nature of the command entered comprises actuating the single indicating element in a preset actuation sequence for indicating the modifying of operational parameters of the device.

21. The method of claim 20, wherein the preset actuation sequence of the single indicating element comprises a preset series of pulses of light, and each such present series of light pulses corresponds to the nature of an entered command, and wherein indicating the nature of the command entered further comprises actuating the single indicating element in a preset actuation sequence comprising a series of light pulses.

\* \* \* \* \*

UNITED STATES PATENT AND TRADEMARK OFFICE
CERTIFICATE OF CORRECTION

PATENT NO. : 6,636,772 B1
DATED : October 21, 2003
INVENTOR(S) : Karol Renau

It is certified that error appears in the above-identified patent and that said Letters Patent is hereby corrected as shown below:

<u>Title page, Item [54], Column 1, line 2,</u>
Delete "DEVICE OPERATION ATTRIBUTE-CONTROLLING COMMANDS", and replace it with -- A COMMAND RELATING TO A FUNCTION OF A DEVICE --.

Signed and Sealed this

Twentieth Day of July, 2004

JON W. DUDAS
*Acting Director of the United States Patent and Trademark Office*